H. KEHOE.
BAKING PAN.
APPLICATION FILED MAY 14, 1914.
1,186,796. Patented June 13, 1916.
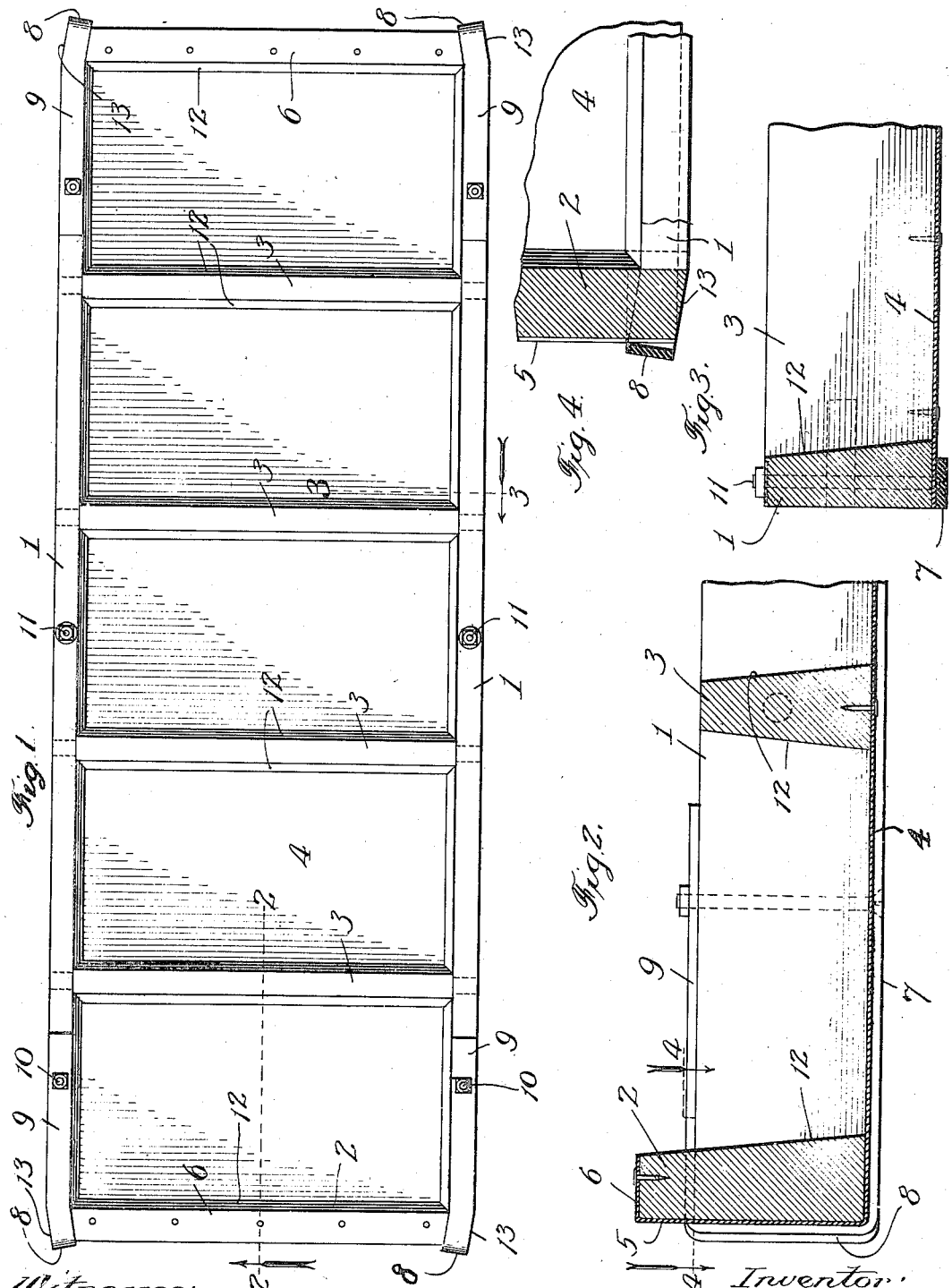
Witnesses:
Inventor:
Harry Kehoe,
By Peirce, Fisher & Clapp
Attys.

UNITED STATES PATENT OFFICE.

HARRY KEHOE, OF CHICAGO, ILLINOIS, ASSIGNOR TO WARD BAKING COMPANY, OF NEW YORK, N. Y., A CORPORATION OF NEW YORK.

BAKING-PAN.

1,186,796.

Specification of Letters Patent.   Patented June 13, 1916.

Application filed May 14, 1914.   Serial No. 838,433.

*To all whom it may concern:*

Be it known that I, HARRY KEHOE, a citizen of the United States, and a resident of the city of Chicago, county of Cook, State of Illinois, have invented certain new and useful Improvements in Baking-Pans, of which the following is a full, clear, and exact description, reference being had to the accompanying drawing, forming part of the specification.

My present invention relates to that class of baking pans in which loaves of cake or the like may be baked without hard crust being formed on the sides or ends thereof.

A further object is to provide a pan having a series of compartments in which the separate loaves are baked and which pans are adapted for use in a large oven.

The invention consists in the features of improvement hereinafter set forth, illustrated in the preferred form in the accompanying drawing and more particularly pointed out in the appended claims.

In the drawings, Figure 1 is a plan view of my improved baking pan. Fig. 2 is a section on the line 2—2 of Fig. 1. Fig. 3 is a section on the line 3—3 of Fig. 1. Fig. 4 is a section on the line 4—4 of Fig. 2.

The pan comprises a frame work having wooden side portions 1, and end portions 2, extending between them. A series of dividing plates 3, complete the frame work of my pan. A sheet metal bottom 4 extends completely beneath the frame work and has upturned ends 5, which extend upwardly and around the end pieces 2. Flanges 6 are formed on the ends of the bottom and extend across the top of the end pieces 2 and are secured thereto. A pair of metal runners 7 extend the full length of the pan beneath the sides 1, having end portions 8 which extend around the ends of the side frame 1 and portions 9 which extend along the top of said side frames. Bolts 10 extend through the portions 9, the side frames 1, the sheet metal bottom 4 and the runners 7, thereby rigidly securing the sheet metal bottom to the frame work. Additional bolts 11 extending through the sides 1, the bottom, and the runners 7, may be supplied at intervals along the side portions in order to further secure the runners beneath the sides 1, and in order to more securely retain the bottom between said runners and said sides.

It is to be noted that in this way a series of compartments are formed having wooden sides and a sheet metal bottom. The sides of each compartment are somewhat beveled to form upwardly and outwardly sloping surfaces, 12, which facilitate in removing cakes or the like from the compartments. All the wood work is coated with a thick coating of asbestos paint which prevents the wood from burning. Each end of the pan is slightly beveled at its end portion as at 13, and the runners 7 and top portions 9 are bent inwardly in order to economize on the space required for the pan. This pan is adapted for use in a rotary oven in which a series of pans are placed radiating from a central portion. By having this bevel 13, it is possible to place an additional pan in the oven as the pans are permitted to fit slightly closer together.

From the foregoing, it would be seen that the use of this pan has several novel features. In the first place the pan is adapted for forming cakes or rather loaves of cake which have a crust at the bottom but which are substantially without crust on the sides or ends. The reason for this is that the wooden sides and ends are not heated as rapidly as metal portions would be. The inner faces of the sides and ends of each compartment are formed with outwardly and upwardly beveled surfaces so that the loaves may be readily removed therefrom. Lastly a pan is provided which has a metal bottom secured to a wooden frame work, not by screws or nails as is the ordinary construction and which readily loosen up when the pan has been heated but which has bolts extending completely through the side portions and securing the runners beneath the metal bottom, thereby retaining the metal bottom securely to the frame. The end 5 of the bottom which extends upwardly and around the end pieces 2, protects that portion of the wood, where the asbestos paint would be apt to be chipped off, against injury and forms a complete protection for the ends of the pan.

By providing runners extending beneath the pan two very important objects are accomplished. In the first place the pan is materially strengthened and permitted to slide easily over the base of the oven without any danger of injury to the pan bottom, Secondly the bottom of the pan is somewhat raised above the oven bottom, forming an air chamber which permits the even distribution of heat along the entire bottom surface of the pan.

It is obvious that numerous changes may be made in the details set forth without departure from the essentials of the invention as defined in the claims.

Having described my invention what I claim as new and desire to secure by Letters Patent, is:—

1. A baking pan comprising a wooden frame formed of sides, end portions and partitions extending between said sides and dividing the pan into a series of compartments having upwardly flaring inner faces, a bottom formed of sheet metal extending from end to end and from side to side of said frame and having upturned ends, and metal runners extending lengthwise of said frame beneath the sides thereof and over the edge portion of said bottom, said metal runners having upturned ends bolted to the sides and ends of the frame.

2. A baking pan comprising a wooden frame formed of sides, ends and partitions secured in place between said sides and dividing the pan into a series of compartments, a sheet metal bottom for said frame and the compartments thereof, a plurality of metal runners extending longitudinally beneath said bottom and upwardly over the ends of said frame and bolts extending through said frame and said runners for clamping said sheet metal bottom in place, substantially as described.

3. A baking pan comprising a wooden frame formed of sides, ends and partitions held in place between said sides and dividing the pan into a series of compartments, a sheet metal bottom for said frame and the compartments thereof, a plurality of metal runners extending longitudinally beneath said bottom and directly beneath said sides, the ends of said runners being bent upwardly over the ends of said frame and inwardly over the tops of said sides, and bolts extending through said sides and said runners for clamping said sheet metal bottom in place, substantially as described.

4. A baking pan comprising a wooden frame formed of sides, ends and a series of transverse partitions held in place between said sides and dividing the frame into a series of compartments having upwardly flaring inner faces, a bottom formed of a single strip of sheet metal extending completely beneath said frame and upwardly over the ends thereof, runners formed of bracing metal straps extending longitudinally beneath said bottom and upwardly over the ends of said frame, and means for securing said runners in place to thereby clamp said sheet metal bottom to said frame, substantially as described.

HARRY KEHOE.

Witnesses:
J. G. ANDERSON,
G. HAGENON.